(12) United States Patent
Tsokkinen et al.

(10) Patent No.: US 11,902,872 B2
(45) Date of Patent: Feb. 13, 2024

(54) MARKING AN UPLINK DATA PACKET

(71) Applicant: Nokia Solutions and Networks Oy, Espoo (FI)

(72) Inventors: Mikko Tsokkinen, Tampere (FI); Jouni Parviainen, Tampere (FI); Mika Uusitalo, Tampere (FI); Sami Siltala, Kempele (FI); Vishwanatha Ramu, Wroclaw (PL)

(73) Assignee: Nokia Solutions and Networks Oy, Espoo (FI)

( * ) Notice: Subject to any disclaimer, the term of this patent is extended or adjusted under 35 U.S.C. 154(b) by 305 days.

(21) Appl. No.: 17/418,962

(22) PCT Filed: Jan. 10, 2020

(86) PCT No.: PCT/FI2020/050018
§ 371 (c)(1),
(2) Date: Jun. 28, 2021

(87) PCT Pub. No.: WO2020/152395
PCT Pub. Date: Jul. 30, 2020

(65) Prior Publication Data
US 2022/0116848 A1   Apr. 14, 2022

(30) Foreign Application Priority Data
Jan. 23, 2019   (FI) .................................. 20195040

(51) Int. Cl.
*H04W 40/02* (2009.01)
*H04W 28/02* (2009.01)
(Continued)

(52) U.S. Cl.
CPC ........... *H04W 40/02* (2013.01); *H04L 5/0053* (2013.01); *H04L 12/4641* (2013.01);
(Continued)

(58) Field of Classification Search
CPC . H04W 40/02; H04W 28/0268; H04W 76/10; H04W 28/0252; H04W 28/0263;
(Continued)

(56) References Cited

U.S. PATENT DOCUMENTS 8,867,361 B2 * 10/2014 Kempf ................ H04L 43/0882
709/224
11,343,703 B2 * 5/2022 Cho ................... H04W 28/0268
(Continued)

FOREIGN PATENT DOCUMENTS

CN    101816214 A    8/2010
CN    103250391 A    8/2013
(Continued)

OTHER PUBLICATIONS

Chinese Office Action dated Jun. 16, 2022, issued in corresponding Chinese Patent Application No. 202080010080.2.
(Continued)

*Primary Examiner* — Ahmed Elallam
(74) *Attorney, Agent, or Firm* — Harness, Dickey & Pierce, P.L.C.

(57) ABSTRACT

An apparatus, method and non-transitory computer-readable medium for establishing a bearer for a terminal device of a cellular communication system, receiving, from the terminal device over the bearer, an uplink data packet including an information element indicating a service associated with the uplink data packet, sending a query including the information element to a networking controller, receiving, from the networking controller as a response to the query, routing information for the uplink data packet and marking the uplink data packet with the routing information and forwarding the uplink data packet to a transport network, and selecting transmission parameters to the uplink data packet based on the routing information.

14 Claims, 4 Drawing Sheets

(51) Int. Cl.
*H04L 45/74* (2022.01)
*H04L 12/46* (2006.01)
*H04W 76/10* (2018.01)
*H04L 5/00* (2006.01)
*H04W 76/12* (2018.01)

(52) U.S. Cl.
CPC ......... *H04L 45/74* (2013.01); *H04W 28/0268* (2013.01); *H04W 76/10* (2018.02)

(58) Field of Classification Search
CPC ... H04L 5/0053; H04L 12/4641; H04L 45/74; H04L 12/4645; H04L 45/302; H04L 45/42; H04L 45/64; H04L 47/2433; H04L 47/2441; H04L 47/2458; H04L 47/2491
See application file for complete search history.

(56) References Cited

U.S. PATENT DOCUMENTS

| | | | |
|---|---|---|---|
| 2012/0155298 A1 | 6/2012 | Yang et al. | |
| 2012/0300615 A1 | 11/2012 | Kempf et al. | |
| 2014/0003357 A1 | 1/2014 | Ejzak et al. | |
| 2015/0280927 A1 | 10/2015 | Liang et al. | |
| 2016/0337937 A1 | 11/2016 | McCann et al. | |
| 2017/0078927 A1* | 3/2017 | Hahn | H04W 36/08 |
| 2017/0347307 A1 | 11/2017 | Mehta et al. | |
| 2018/0027451 A1* | 1/2018 | Sun | H04L 47/20 370/235 |
| 2020/0169913 A1* | 5/2020 | Byun | H04W 28/02 |
| 2020/0404547 A1* | 12/2020 | Qiao | H04W 28/0268 |
| 2022/0039177 A1* | 2/2022 | Talebi Fard | H04W 48/00 |
| 2023/0300662 A1* | 9/2023 | Chunduri | H04W 28/0992 370/235 |

FOREIGN PATENT DOCUMENTS

| | | |
|---|---|---|
| CN | 104620664 A | 5/2015 |
| CN | 104902518 A | 9/2015 |
| EP | 3010278 A1 | 4/2016 |
| EP | 2831733 B1 | 7/2017 |
| JP | 2014-533476 A | 12/2014 |
| JP | 2018-046545 A | 3/2018 |
| WO | WO-2016091298 A1 | 6/2016 |

OTHER PUBLICATIONS

Office Action for European Application No. 20 702 342.5 dated May 30, 2023.
International Search Report PCT/ISA/210 for International Application No. PCT/FI2020/050018 dated Jan. 10, 2021.
International Preliminary Report on Patentability dated Apr. 22, 2021.
Office Action for Japanese Application No. 2021-542381 dated Sep. 13, 2022.
Ericsson, Discussion on options to limit the size of QFI to 6 bits in RAN [online], 3GPP TSG SA WG2 #126 S2-181902, Internet; URL:https://www.3gpp.org/ftp/tsq_sa/WG2_Arch/TSGS2_126_Montreal/Docs/S2-181902.zip <https://protect-us.mimecast.com/s/poWLCKrY1zUDKxVQf3Mbih> , Feb. 20, 2018.

* cited by examiner

| QCI / 5QI | 802.1Q |
|---|---|
| 128 | PCP, DEI, VID |
| 129 | PCP, DEI, VID |
| ... | ... |
| 255 | PCP, DEI, VID |

Figure 7

MARKING AN UPLINK DATA PACKET

CROSS-REFERENCE TO RELATED APPLICATIONS

This application is a national phase under 35 U.S.C. § 371 of PCT International Application No. PCT/FI2020/050018 which has an International filing date of Jan. 10, 2020, which claims priority of FI Application No. 20195040, filed Jan. 23, 2019, the entire contents of each of which are hereby incorporated by reference.

TECHNICAL FIELD

The present application relates generally to marking an uplink data packet. More specifically, the present application relates to marking an uplink data packet with routing information.

BACKGROUND

Users need to send and receive data across shared or public networks in a secure way. Existing mobile networks utilize an access point name (APN) to identify the gateway and the packet data network (PDN) the user wants to communicate with. In 5G, data networks are identified using Data Network Name (DNN). DNN is typically in the form of an APN.

SUMMARY

Various aspects of examples of the invention are set out in the claims.

According to a first aspect of the invention, there is provided an apparatus comprising means for performing: establishing a bearer for a terminal device of a cellular communication system, receiving, from the terminal device over the bearer, an uplink data packet comprising an information element indicating a service associated with the uplink data packet, sending a query comprising the received information element to a networking controller, receiving, from the networking controller as a response to the query, routing information for the uplink data packet, and causing marking the uplink data packet with the routing information and forwarding the uplink data packet to a transport network.

According to a second aspect of the invention, there is provided a method comprising: establishing a bearer for a terminal device of a cellular communication system, receiving, from the terminal device over the bearer, an uplink data packet comprising an information element indicating a service associated with the up-link data packet, sending a query comprising the received information element to a networking controller, receiving, from the networking controller as a response to the query, routing information for the uplink data packet, and causing marking the uplink data packet with the routing information and forwarding the uplink data packet to a transport network.

According to a third aspect of the invention, there is provided a computer program comprising instructions for causing an apparatus to perform at least the following: establishing a bearer for a terminal device of a cellular communication system, receiving, from the terminal device over the bearer, an uplink data packet comprising an information element indicating a service associated with the uplink data packet, sending a query comprising the received information element to a networking controller, receiving, from the networking controller as a response to the query, routing information for the uplink data packet, and causing marking the uplink data packet with the routing information and forwarding the uplink data packet to a transport network.

According to a fourth aspect of the invention, there is provided an apparatus comprising at least one processor and at least one memory including computer program code, the at least one memory and the computer program code configured to with the at least one processor, cause the apparatus at least to perform: establish a bearer for a terminal device of a cellular communication system, receive, from the terminal device over the bearer, an uplink data packet comprising an information element indicating a service associated with the uplink data packet, send a query comprising the received information element to a networking controller, receive, from the networking controller as a response to the query, routing information for the uplink data packet and cause marking the uplink data packet with the routing information and forward the uplink data packet to a transport network.

According to a fifth aspect of the invention, there is provided a non-transitory computer readable medium comprising program instructions for causing an apparatus to perform at least the following: establishing a bearer for a terminal device of a cellular communication system, receiving, from the terminal device over the bearer, an uplink data packet comprising an information element indicating a service associated with the up-link data packet, sending a query comprising the received information element to a networking controller, receiving, from the networking controller as a response to the query, routing information for the uplink data packet and causing marking the uplink data packet with the routing information and forwarding the uplink data packet to a transport network.

According to a sixth aspect of the invention, there is provided a computer readable medium comprising program instructions for causing an apparatus to perform at least the following: establishing a bearer for a terminal device of a cellular communication system, receiving, from the terminal device over the bearer, an uplink data packet comprising an information element indicating a service associated with the up-link data packet, sending a query comprising the received information element to a networking controller, receiving, from the networking controller as a response to the query, routing information for the uplink data packet and causing marking the uplink data packet with the routing information and forwarding the uplink data packet to a transport network.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

Example embodiments relate to marking an uplink data packet. According to an example embodiment, an apparatus is configured to establish a bearer for a terminal device of a cellular communication system and receive, from the terminal device over the bearer, an uplink data packet comprising an information element indicating a service associated with the uplink data packet. The apparatus is further configured to send a query comprising the received information element to a networking controller and receive, from the networking controller as a response to the query, routing information for the uplink data packet. The apparatus is yet further configured to cause marking the uplink data packet with the routing information and forwarding the uplink data packet to a transport network.

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
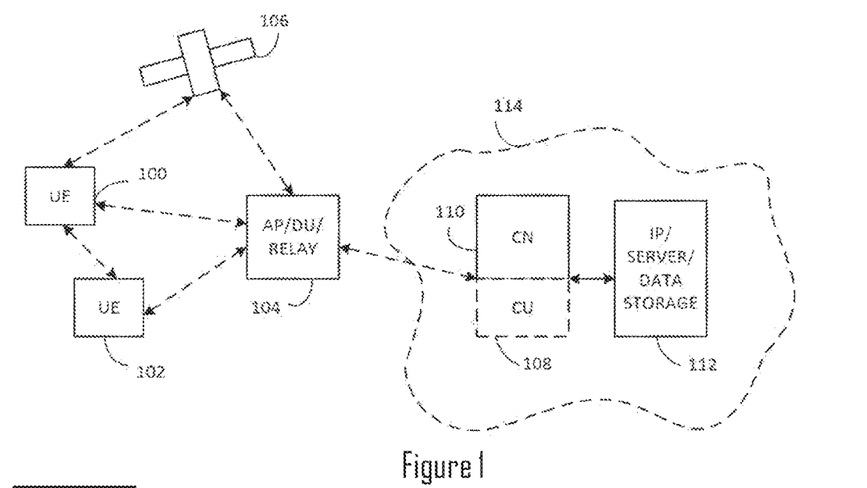
FIG. 1 shows a part of an exemplifying radio access network in which examples of disclosed embodiments may be applied.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a cell with an access node (such as (e/g)NodeB) 104 providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used not only for signalling purposes but also for routing data from one (e/g)NodeB to another. The (e/g)NodeB is a computing device configured to control the radio resources of communication system it is coupled to. The NodeB may also be referred to as a base station, an access point, an access node, or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device may also utilise cloud. In some applications, a user device may comprise a small portable device with radio parts (such as a watch, earphones or eyeglasses) and the computation is carried out in the cloud. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

A wireless device is a generic term that encompasses both the access node and the terminal device.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being integradable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low-latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilise services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of functions between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or node B (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway, maritime, and/or aeronautical communications. Satellite communication may utilise geostationary earth orbit (GEO) satellite systems, but also low earth orbit (LEO) satellite systems, in particular mega-constellations (systems in which hundreds of (nano)satellites are deployed). Each satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

As commonly known in connection with wireless communication systems, control or management information is transferred over a radio interface, e.g. between the terminal device 100 and the access node 104.

Existing mobile networks utilize Access Point Name (APN) to identify the serving packet gateway and the packet data network for the UE to communicate with. An APN is also used as a mobile service identifier for, for example, internet access, multimedia messaging service (MMS), Voice over LTE (VoLTE) and enterprise specific access. However, an APN and hence, also the mobile service, is not visible to a serving base station and the transport network, and the traffic is forwarded by the base station (e.g. eNodeB) to the gateway (e.g. Security GateWay, S-GW and Packet Data Network Gateway (P-GW)) regardless of the service associated with the traffic. Since the base station cannot differentiate between different mobile services, it is also not able to provide any indication to the transport network regarding the service and associated quality of service parameters. This degrades, for example, Virtual Private Networking (VPN) services in existing mobile networks.

Figure 3:
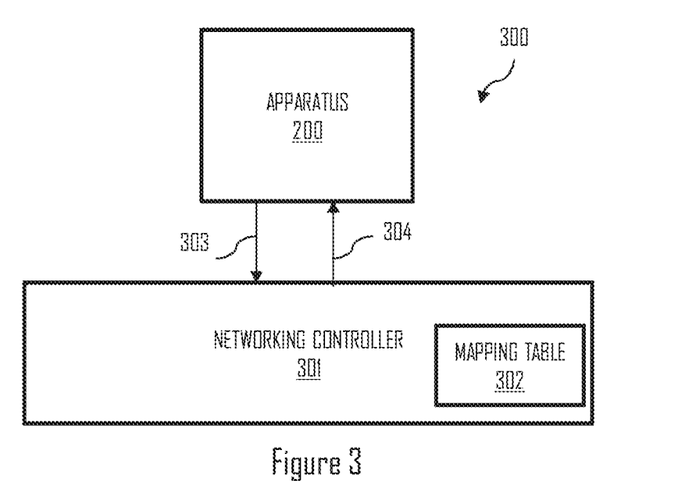
FIG. 3 shows a block diagram of an example overall architecture in which examples of disclosed embodiments may be applied.

FIG. 3 is a block diagram 300 depicting an overall architecture according to an example embodiment of the invention. In this example, an apparatus 200 is an access node such as a base station, similar to the access node 104 in FIG. 1. A base station may be, for example, an eNodeB or gNodeB.

The apparatus 200 is configured to establish a bearer for a terminal device of a cellular communication system. A bearer is a telecommunication service that is used for transferring user data and/or control signals between two pieces of equipment. There are different types of bearers: a data bearer configured to transfer data, a signalling bearer configured to carry signalling data and a radio bearer between a base station and user equipment. In other words, a bearer is a tunnel used for connecting a user equipment to Packet Data Networks (PDN) such as the internet. Different bearer services may differ by their information transfer characteristics (e.g. data transfer rate, direction(s) of data flow, type of transfer and/or other physical characteristics), methods of accessing the service, interworking requirements and other general attributes.

A terminal device may be an electronic device such as a hand-portable device, a mobile phone or a Personal Digital Assistant (PDA), a Personal Computer (PC), a laptop, a desktop, a tablet computer, a wireless terminal, a communication terminal, a game console, a music player, an electronic book reader (e-book reader), a positioning device, a digital camera, a household appliance, a CD-, DVD or Blu-ray player, or a media player.

The apparatus 200 is further configured to receive from the terminal device, over the bearer, an uplink data packet comprising an information element indicating a service. An uplink data packet comprises a data packet received from the terminal device to the base station.

According to an example embodiment, the uplink data packet comprises an information element. In an example embodiment, the information element comprises Quality of Service (QoS) information that enables providing different priority to different applications, users and/or data flows. QoS information comprises assigning priority to services by means of a quality identifier such as an LTE QoS class identifier (QCI) or a 5G QoS identifier (5QI). A QoS identifier may be an integer value used for identifying a specific QoS forwarding treatment for data flow. In other words, an access node such as a base station and transport network may provide different treatment for traffic belonging to different QoS classes.

According to an example embodiment, the information element comprises a quality of service (QoS) identifier. In another example embodiment, the QoS identifier comprises a QCI or 5QI of 3GPP specifications.

As stated above, the information element indicates a service associated with the uplink data packet. In an example embodiment, the service comprises a Virtual Private Network (VPN) service. A VPN service is configured to split a physical network into multiple logical networks. In other words, a VPN service allows users to securely access a private network and share data remotely through public networks.

To continue with the example of FIG. 3, the apparatus 200 is further configured to send a query 303 comprising the received information element to a networking controller 301. According to an example embodiment, the apparatus 200 is configured to send the query in response to receiving an unidentified information element.

In an example embodiment, the apparatus 200 comprises a networking agent configured to interface with the networking controller 301 and the networking agent is configured to cause sending the query 303.

In an example embodiment, the networking controller 301 is a software-defined networking (SDN) controller. In SDN the data plane and the control plane of a network are decoupled, and the control plane is implemented in software. In other words, SDN enables separating the intelligence of network components by shifting the decision-making abilities to a separate software component such as an SDN controller. An SDN controller is an application configured to direct traffic according to forwarding policies defined by a network operator. An SDN controller may be implemented as one or more software components, which reside on one or more physical entities.

The networking controller 301 is configured to maintain a mapping table 302 comprising quality of service information and corresponding routing information. The mapping table 302 may be provisioned and maintained via a management system (e.g. Operation and Maintenance system (OAM)) or, for example, using an SDN application. Further, the networking controller 301 may be configured to serve the mapping table to network elements. According to an example embodiment, the networking controller 301 is configured to inform the apparatus 200 that the mapping table 302 has changed and the apparatus is configured to send a query 303 based on the information.

The apparatus 200 is configured to receive from the networking controller 301, as a response to the query 303, routing information 304 for the uplink data packet. The routing information may be received by the networking agent.

According to an example embodiment, the routing information 304 comprises Ethernet parameters such as 802.1Q parameters. 802.1Q is a protocol for carrying a Virtual Local Area Network (VLAN) traffic on an Ethernet. A VLAN is a local area network that does not have its own dedicated physical infrastructure, but instead uses another local area network to carry its traffic. 802.1Q parameters may include 802.1P class of service (PCP), drop eligible indicator (DEI) and/or VLAN identifier (VID).

According to another example embodiment, the routing information 304 comprises a VLAN identifier (VID). A VLAN identifier identifies to which VLAN each packet belongs.

According to a further example embodiment, the routing information 304 comprises header information and the apparatus 200 is configured to add the header information to the uplink data packet before forwarding the data packet to a transport network.

According to a yet further example embodiment, the routing information 304 comprises a virtual identifier and the apparatus is configured to select an output port for the uplink data packet based on the virtual identifier and output the uplink data packet to the output port.

The apparatus 200 is further configured to cause marking the uplink data packet with the routing information and forwarding the uplink data packet to a transport network.

According to an example embodiment, the apparatus 200 is configured to receive, as a response to the query, routing information 304 from the network controller. Routing information may comprise an information element indicating a forwarding policy to the uplink data packet, and the apparatus 200 may select transmission parameters for the uplink data packet based on the routing information. The routing information may comprise, for example, an Ethernet 802.1Q header. The transmission parameters may characterize, for example, QoS parameters applied to the uplink packet in a transport network to which the apparatus forwards the uplink packet.

In an example embodiment, the apparatus is further configured to mark an up-link packet with the routing information. Marking an uplink packet may comprise, for example, tunnel or transport tagging, or virtual local area network (VLAN) tagging. For example, VLANs work by applying tags to network packets and handling the tags in networking systems. VLANs create the appearance and functionality of network traffic that is physically on a single network but acts as if it was split between separate networks. In this way, VLANs can keep network applications separate despite being connected to the same physical network and without requiring multiple sets of cabling and networking devices to be deployed. This solution extends the usage of the existing QoS mechanism to include the VLAN information for base stations.

Marking may also be performed using some other tunnelling or transport mechanism such as Virtual Extensible LAN (VXLAN), Generic Routing Encapsulation (GRE), Multiprotocol Label Switching (MPLS), Internet Protocol Security (IPSEC) or slice specific IP addressing. In such a case, the networking controller 301 may contain additional/different columns in the mapping table to provide appropriate tunnel identifiers/mapping tags for marking data packets.

Figure 2:
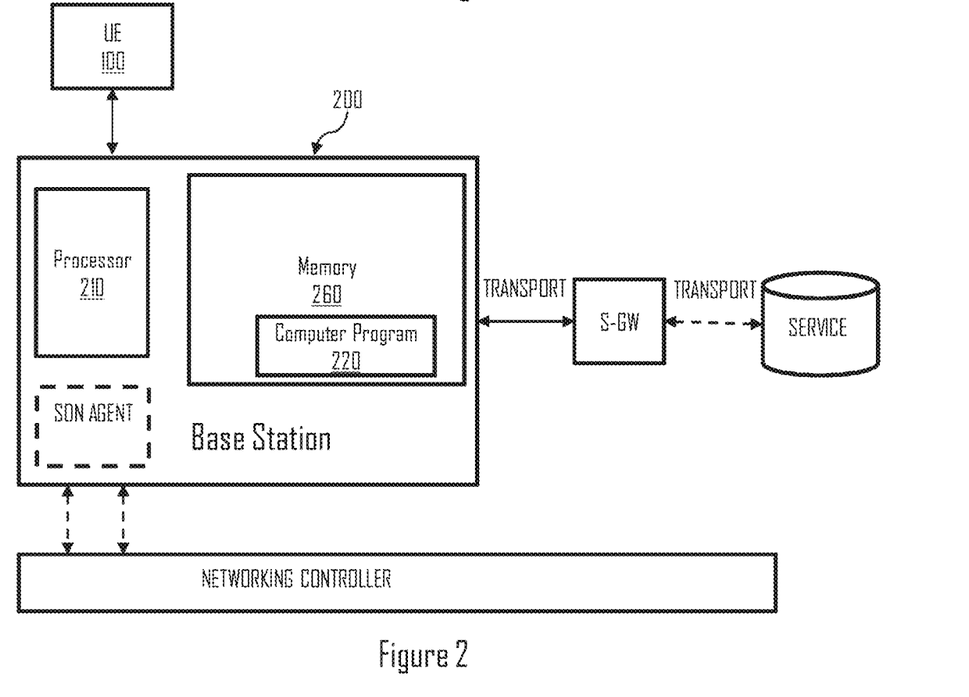
FIG. 2 shows a block diagram of an example apparatus in which examples of the disclosed embodiments may be applied.

The example of FIG. 2 shows an exemplifying apparatus.

FIG. 2 is a block diagram depicting the apparatus 200 operating in accordance with an example embodiment of the invention. The apparatus 200 may be, for example, an electronic device such as a chip, chip-set, an electronic device or an access node such as a base station. In the example of FIG. 2, the apparatus is a base station such as an eNodeB or gNodeB. The apparatus 200 includes a processor 210 and a memory 260. In other examples, the apparatus 200 may comprise multiple processors.

In the example of FIG. 2, the processor 210 is a control unit operatively connected to read from and write to the memory 260. The processor 210 may also be configured to receive control signals received via an input interface and/or the processor 210 may be configured to output control signals via an output interface. In an example embodiment the processor 210 may be configured to convert the received control signals into appropriate commands for controlling functionalities of the apparatus.

The memory 260 stores computer program instructions 220 which when loaded into the processor 210 control the operation of the apparatus 200 as explained below. In other examples, the apparatus 200 may comprise more than one memory 260 or different kinds of storage devices.

Computer program instructions 220 for enabling implementations of example embodiments of the invention or a part of such computer program instructions may be loaded onto the apparatus 200 by the manufacturer of the apparatus 200, by a user of the apparatus 200, or by the apparatus 200 itself based on a download program, or the instructions can be pushed to the apparatus 200 by an external device. The computer program instructions may arrive at the apparatus 200 via an electromagnetic carrier signal or be copied from a physical entity such as a computer program product, a memory device or a record medium such as a Compact Disc (CD), a Compact Disc Read-Only Memory (CD-ROM), a Digital Versatile Disk (DVD) or a Blu-ray disk.

According to an example embodiment, the apparatus 200 comprises means for performing, wherein the means for performing comprises at least one processor 210, at least one memory 260 including computer program code 220, the at least one memory 260 and the computer program code 220 configured to, with the at least one processor 210, cause the performance of the apparatus 200.

The base station is configured to communicate with user equipment (UE) 100 and a networking controller such as a software-defined networking (SDN) controller or other network management system. The base station may comprise a networking agent, such as an SDN agent, configured to interface with the networking controller, such as the SDN controller. The base station, such as an eNodeB or gNodeB, is also configured to communicate with a Serving Gateway (S-GW) configured to forward and route data packets to and from the base station according to a desired service, for example, according to Quality of Service determined for the service.

Figure 4:
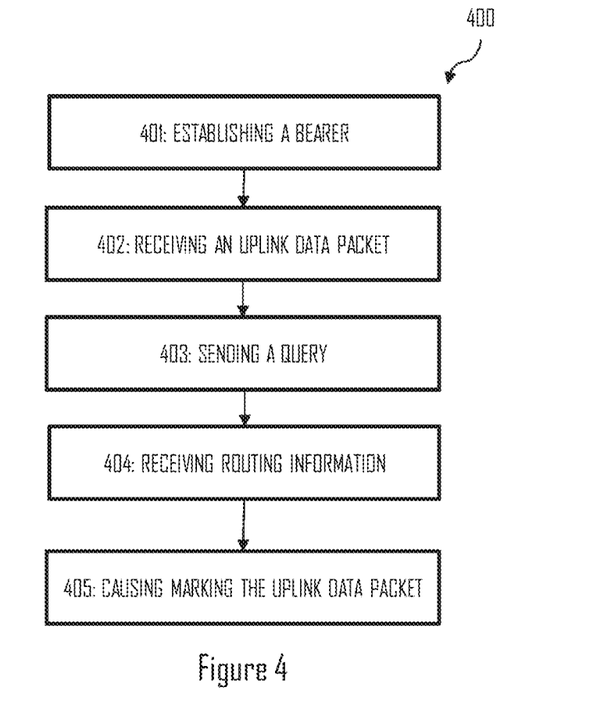
FIG. 4 illustrates an example method incorporating aspects of the examples of the invention.

FIG. 4 illustrates an example method 400 incorporating aspects of the previously disclosed embodiments. More specifically the example method 400 illustrates marking an uplink data packet.

The method starts with establishing 401 a bearer for a terminal device of a cellular communication system. The method continues with receiving 402, from the terminal device, over the bearer, an uplink packet comprising an information element indicating a service associated with the uplink data packet. In an example embodiment, the information element comprises QoS information.

The method further continues with sending 403 a query comprising the received information element to a networking controller and receiving 404, from the networking controller as a response to the query, routing information for the uplink data packet. The method further comprises causing 405 marking the uplink data packet with the routing information and forwarding the uplink data packet to a transport network.

Figure 5:
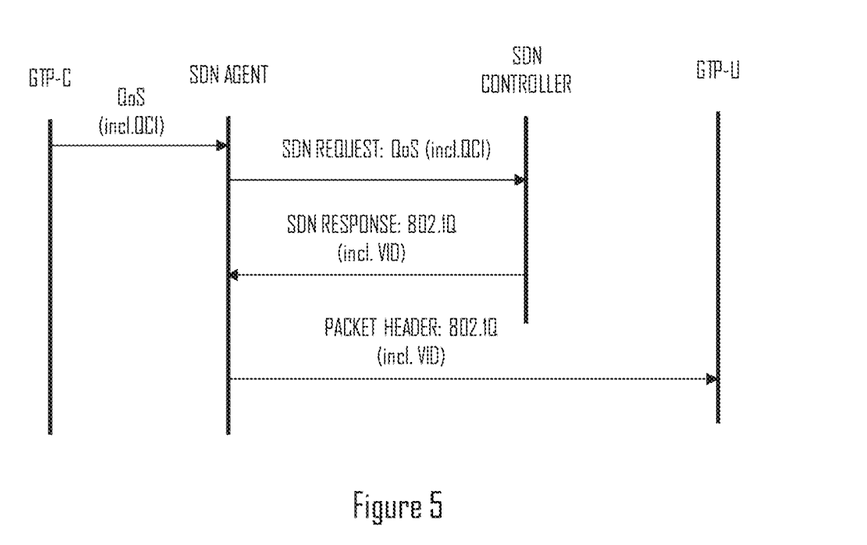
FIG. 5 illustrates an example signalling diagram incorporating aspects of the examples of the invention.

FIG. 5 illustrates an example signalling diagram depicting marking an uplink data packet. In this embodiment, the networking controller 301 is an SDN controller and the networking agent is an SDN agent. The GPRS Tunnelling Protocol Control (GTP-C) receives during standard bearer setup QoS information including a QCI. The GTP-C passes the QoS information including the QCI to an SDN agent. The SDN agent is implemented in the apparatus 200 and interfaces with the SDN controller. The SDN agent sends a query comprising the received QoS information including the QCI to the SDN controller. As a response to the query, the SDN agent receives 802.1Q parameters including a VID for routing a data packet. The SDN controller selects the 802.1Q parameters to be sent to the SDN agent based on a mapping table comprising QoS information and corresponding routing information. The SDN agent then passes the information received from the SDN controller to GPRS Tunnelling Protocol User GTP-U packet processing. According to an example embodiment, GTP-C and GTP-U are implemented in the apparatus 200.

Figure 6:
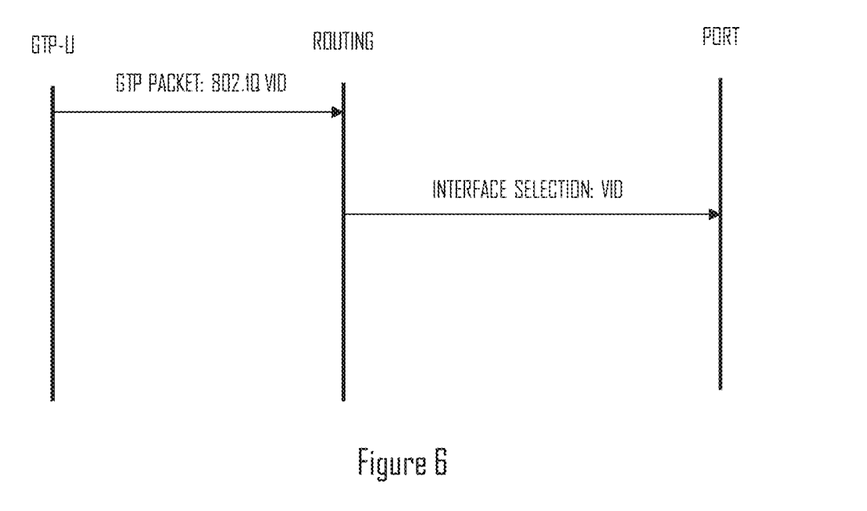
FIG. 6 illustrates an example signalling diagram incorporating aspects of the examples of the invention.

FIG. 6 illustrates an example signalling diagram depicting selecting an output port for an uplink data packet. The GTP-U processes the data packet and passes it to routing. According to an example embodiment, GTP-U is implemented in the apparatus 200. Routing decides the outgoing port at least partially based on 802.1Q parameters such as the VID.

Figure 7:
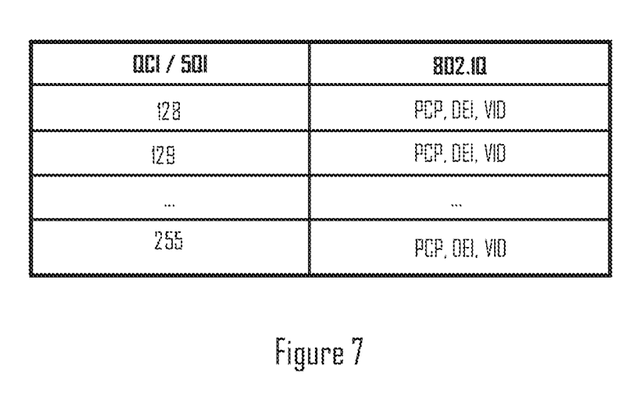
FIG. 7 illustrates an example of a mapping table according to an example embodiment of the invention.

FIG. 7 illustrates an example of a mapping table maintained by an SDN controller. The table comprises quality of service information (QCI/5QI) and corresponding routing information (PCP, DEI, VID).

Without limiting the scope of the claims, an advantage of marking an uplink data packet is that the routing information is visible to the transport network. This allows for a base station and the transport network to provide different services for different data packets. Further, the routing information enables providing VPN services in existing mobile networks.

Without in any way limiting the scope, interpretation, or application of the claims appearing below, a technical effect of one or more of the example embodiments disclosed herein is that QoS parameters provided by a user equipment can be transmitted to a transport network even if a base station (e.g. eNodeB or gNodeB) does not identify a service indicated by an information element provided by the user equipment. Another technical effect is that VPN services may be provided in existing mobile networks.

It should also be noted that even though the example embodiments disclose uplink traffic, downlink traffic may also be routed to the same logical connection/interface.

Embodiments of the present invention may be implemented in software, hardware, application logic or a combination of software, hardware and application logic. The software, application logic and/or hardware may reside on the apparatus, a separate device or a plurality of devices. If desired, part of the software, application logic and/or hardware may reside on the apparatus, part of the software, application logic and/or hardware may reside on a separate device, and part of the software, application logic and/or hardware may reside on a plurality of devices. In an example embodiment, the application logic, software or an instruction set is maintained on any one of various conventional computer-readable media. In the context of this document, a 'computer-readable medium' may be any media or means that can contain, store, communicate, propagate or transport the instructions for use by or in connection with an instruction execution system, apparatus, or device, such as a computer, with one example of a computer described and depicted in FIG. 2. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It will be obvious to a person skilled in the art that, as the technology advances, the inventive concept can be implemented in various ways. The invention and its embodiments are not limited to the examples described above but may vary within the scope of the claims.

The invention claimed is:

1. An apparatus comprising:
   at least one processor, at least one memory including computer program code, the at least one memory and the computer program code configured to, with the at least one processor, cause the apparatus to perform,
   establishing a bearer for a terminal device of a cellular communication system;
   receiving, from the terminal device over the bearer, an uplink data packet comprising an information element indicating a service associated with the uplink data packet;
   sending a query comprising the information element to a networking controller;
   receiving, from the networking controller as a response to the query, routing information for the uplink data packet, wherein the routing information comprises an information element indicating a forwarding policy to the uplink data packet;
   marking the uplink data packet with the routing information and forwarding the uplink data packet to a transport network; and
   selecting transmission parameters to the uplink data packet based on the routing information.

2. The apparatus according to claim 1, wherein the information element comprises quality of service information.

3. The apparatus according to claim 1, wherein the information element comprises a quality of service identifier.

4. The apparatus according to claim 3, wherein the information element comprises QCI/5QI of 3GPP specifications.

5. The apparatus according to claim 1, wherein the routing information comprises 802.1Q parameters.

6. The apparatus according to claim 1, wherein the routing information comprises a virtual local area network identifier.

7. The apparatus according to claim 1, wherein the routing information comprises header information; and the at least one memory and the computer program code are configured to, with the at least one processor, cause the apparatus at least to add the header information to the uplink data packet before forwarding.

8. The apparatus according to claim 1, wherein the routing information comprises a virtual identifier; and the at least one memory and the computer program code are configured to, with the at least one processor, cause the apparatus at least to select an output port for the uplink data packet based on the virtual identifier and output the uplink data packet to the output port.

9. The apparatus according to claim 1, wherein the networking controller is a software-defined network controller.

10. The apparatus according to claim 1, wherein the apparatus comprises a networking agent configured to interface with the networking controller.

11. The apparatus according to claim 1, wherein the service indicated by the information element comprises a virtual private network service.

12. The apparatus according to claim 1, wherein the apparatus is a base station.

13. A method comprising:
 establishing a bearer for a terminal device of a cellular communication system;
 receiving, from the terminal device over the bearer, an uplink data packet comprising an information element indicating a service associated with the uplink data packet;
 sending a query comprising the information element to a networking controller;
 receiving, from the networking controller as a response to the query, routing information for the uplink data packet, wherein the routing information comprises an information element indicating a forwarding policy to the uplink data packet;
 marking the uplink data packet with the routing information and forwarding the uplink data packet to a transport network; and
 selecting transmission parameters to the uplink data packet based on the routing information.

14. A non-transitory computer-readable medium storing computer program instructions, which when executed by a processor, cause an apparatus including the processor to perform at least the following:
 establishing a bearer for a terminal device of a cellular communication system;
 receiving, from the terminal device over the bearer, an uplink data packet comprising an information element indicating a service associated with the uplink data packet;
 sending a query comprising the information element to a networking controller;
 receiving, from the networking controller as a response to the query, routing information for the uplink data packet, wherein the routing information comprises an information element indicating a forwarding policy to the uplink data packet;
 marking the uplink data packet with the routing information and forwarding the uplink data packet to a transport network; and
 selecting transmission parameters to the uplink data packet based on the routing information.

* * * * *